United States Patent Office 3,172,624
Patented Mar. 9, 1965

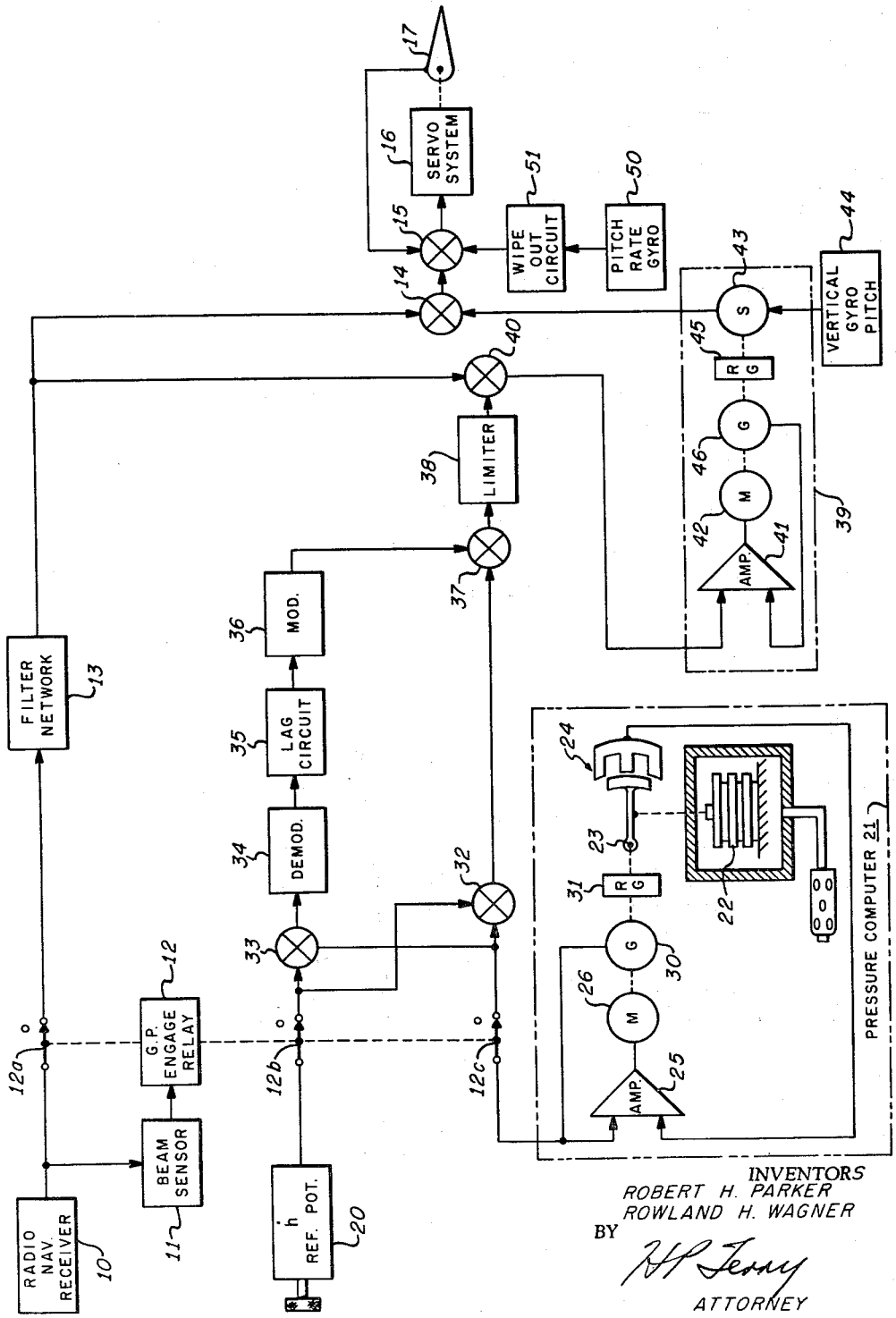

3,172,624
AUTOMATIC APPROACH SYSTEM FOR AIRCRAFT
Robert H. Parker and Rowland H. Wagner, Phoenix, Ariz., assignors to Sperry Rand Corporation, Great Neck, N.Y., a corporation of Delaware
Filed July 18, 1963, Ser. No. 296,037
5 Claims. (Cl. 244—77)

This invention relates to automatic approach apparatus for aircraft and particularly to apparatus for capturing and following the center line of a radio defined glide slope beam of an instrument landing system to effect an automatic landing.

In certain prior art automatic pilot systems, for example those of the type disclosed in U.S. Patent No. 3,007,656, issued November 7, 1961, entitled "Aircraft Automatic Pilots" of H. Miller et al. filed March 15, 1956, when the automatic approach mode is selected, the glide path control configuration is engaged automatically when the center line of the glide path beam is penetrated. The center line of the glide path beam of a conventional instrument landing system (I.L.S.) is disposed at an angle of 2½° with respect to the earth. Therefore, if the aircraft maintained a horizontal flight path prior to penetrating the beam center line, it would have to change its flight path by 2½° in a downward direction to follow the center line of the glide path beam. This necessitates a 2½° pitch down bias to prevent a stand-off error from the center line of the glide slope beam. In the automatic approach system described in the aforementioned U.S. Patent No. 3,007,656, the 2½° pitch down bias is provided by a signal representative of the integral of the displacement of the aircraft from the center line of the glide slope. This arrangement requires a stand-off error above the beam for a time interval long enough for the integrating device responsive to the glide slope displacement signal to generate the necessary 2½° pitch down signal. Since the gain of the glide path integral signal must be relatively low for reasons of flight path stability, the aforementioned arrangement results in the aircraft standing-off above the beam center for a long period of time, i.e., an undesirable overshoot.

The present invention is also an improvement over the systems described in U.S. Patent No. 3,058,699, issued October 16, 1962, entitled "Automatic Approach System for Aircraft" of Stephen S. Osder, filed April 6, 1961, and Patent No. 3,059,881, issued October 23, 1962, entitled "Automatic Approach System for Aircraft," of Richard A. Letson, filed April 6, 1961, in that the difference between the reference signal representative of the nominal rate of descent and that representative of the actual rate of descent provides dynamic control from the capture of the glide path through the glide beam extension mode of operation without introducing undesirable transients when going from one mode of operation to another.

It is therefore a primary object of the present invention to provide an automatic approach system for aircraft which captures the center line of the glide slope beam, follows it and provides dynamic control without introducing transients when going from one mode of operation to another.

It is a further object of the present invention to provide an automatic approach system which permits smooth transition from one mode of operation to another utilizing a glide slope beam to approach a runway while continuing to provide a dynamic rate of descent control signal.

The above objects are accomplished by controlling the pitch attitude of the craft in accordance with a rate of descent error signal which is rendered effective immediately upon the aircraft reaching a predetermined position with respect to the center line of the glide slope beam and is slowly rendered ineffective by exact cancellation of an equal and opposite signal through a network having a predetermined time constant. After the predetermined time constant has expired the aircraft control system is responsive only to the dynamic perturbations of the rate of descent error signal.

These and other objects will become apparent by referring to the drawing which is a schematic wiring diagram of an automatic approach system incorporating the present invention.

The present invention will now be described applied to an automatic flight control system utilizing a displacement type servo system of the type described in U.S. Patent No. 2,636,699 entitled "Automatic Pilot for Aircraft" issued to G. Jude et al. on April 28, 1953. The invention is also applicable to flight director systems, for example, of the type disclosed in U.S. Patent 2,613,352 entitled "Radio Navigation System" issued to S. Kellogg II on October 7, 1952. It will be appreciated that the present invention is equally applicable to flight control systems utilizing velocity servo systems as described in the aforementioned U.S. Patent No. 3,007,656.

Referring now to the drawings, a radio navigation receiver 10 is tuned to provide a D.C. signal having a magnitude and polarity representative of the magnitude and sense respectively of the displacement of the aircraft with respect to the center line of a particular glide slope beam. In the approach mode of operation when the aircraft is a predetermined distance from the center line of the radio beam, a beam sensor 11 connected to be responsive to the displacement signal from the receiver 10 actuates a glide path engage relay 12. This causes the relay 12 to engage thereby positioning its contact arms 12a, 12b, and 12c to their lower or closed positions as shown.

Thus, in the approach mode of operation, the radio displacement signal from the receiver 10 is connected through the contact arm 12a and a filter network 13 to an input terminal of an algebraic summation device 14. The filter network 13 provides a smoothing function to prevent signals from being introduced too abruptly into the elevator channel in a manner to be described. The output terminal of the algebraic summation device 14 is connected to an algebraic summation device 15 which in turn has its output connected to an elevator displacement servo system 16 that drives the elevator 17 to control the aircraft in pitch.

A pitch down reference signal $\dot{h}_{\text{ref}}$ is generated in a potentiometer 20 representative of a nominal rate of descent defined by the angle of the center line of the glide slope beam with respect to the earth and the approach speed of the aircraft. Since the approach speed for a particular aircraft varies very little from one approach to another, a nominal approach speed V can be used with little error. The nominal rate of descent reference signal $\dot{h}_{\text{ref}}$ so regenerated is a voltage defined by $\dot{h}_{\text{ref}} = V \sin 2\frac{1}{2}°$ where the glide slope center line is at a 2½° angle with respect to the earth. The signal $\dot{h}_{\text{ref}}$ is thus representative of a desired rate of descent which may also be considered as a commanded flight path angle.

A signal representative of the actual rate of descent $\dot{h}$ of the aircraft is obtained from a pressure computer 21 or alternatively from a radio altimeter (not shown) or a combination thereof. The pressure computer 21 may be of the type disclosed in U.S. Patent 2,729,780 entitled "Altitude Control for Automatic Pilots" of H. Miller et al. issued January 3, 1956. The pressure computer 21 includes an evacuated bellows 22 responsive to static pressure which positions the armature of an E-pick-off 24 against the spring restraint of a torsion bar 23. The output signal of the E-pick-off 24 has an amplitude and phase representative of the magnitude and sense respectively of the armature displacement from a force balance central position.

The pick-off 24 is connected to an input terminal of a summing amplifier 25 which in turn is connected to control a servomotor 26. The output shaft 27 of the servomotor 26 is connected to drive a tachometer generator 30 and also, through a reduction gearing 31, the torsion bar 23 is rotated in a direction to provide a restoring moment which opposes the moment resulting from the evacuated diaphragm's response to a pressure change. The restoring moment obtained by winding the torsion bar 23 returns the E-pick-off armature to its null position following any barometric pressure change which causes the diaphragm 22 to displace the armature. The tachometer generator 30 provides a signal representative of the actual rate of change of aircraft altitude $\dot{h}$, i.e., rate of descent, which is connected to an input terminal of the summing amplifier 25 in feedback fashion to stabilize the force balance servo loop. The $\dot{h}$ signal is also connected through the relay contact arm 12c to an input terminal of an algebraic summation device 32. The other input terminal of the summation device 32 is connected to the $\dot{h}_{ref}$ potentiometer 20 through the relay contact arm 12b. The nominal rate of descent signal $\dot{h}_{ref}$ from the potentiometer 20 is applied in opposition to the actual rate of descent signal $\dot{h}$ from the tachometer generator signal 30 in order that the output signal from the summation device 32 is an error signal representative of the difference therebetween, i.e., $\dot{h}_{error}$.

The $\dot{h}$ signal is also connected to an input terminal of an algebraic summation device 33 which has its other input terminal connected through the contact arm 12b to the $\dot{h}_{ref}$ potentiometer 20. The output terminal of the algebraic summation device 33 is connected to a demodulator 34 which is connected in turn to a long time constant circuit 35. The circuit 35 is preferably an integrating or lag type RC network having a time constant of approximately 25 seconds for reasons to be explained. The circuit 35 is connected to a modulator 36 that in turn is connected to an input terminal of an algebraic summation device 37 which has its other input terminal connected to the output terminal of the algebraic summation device 32. The output terminal of the algebraic summation device 37 is connected to a limiter 38 which in turn is connected to an input terminal of an algebraic summation device 40 of the electromechanical integrator 39. The other input terminal of the algebraic summation device 40 is connected to the filter network 13. The output terminal of the device 40 is connected to the amplifier 41 of an electromechanical integrator 39 which drives a servo motor 42. The servo motor 42, via reduction gearing 45, positions the rotor of a synchro transmitter 43 which has its stator responsive to the pitch signal from a vertical gyro 44. The servo motor 42 also drives a tachometer generator 46 which provides a rate feedback signal to the amplifier 41 that establishes the basic gain of the electromechanical integrator 39. The synchro 43 is connected to the other input terminal of the algebraic summation device 14. In order to provide a pitch rate signal, a pitch rate gyro 50 is connected through a wipe out circuit 51 to an input terminal of the algebraic summation device 15.

In operation, during the approach mode of operation, the radio displacement signal from the navigation receiver 10 and the $\dot{h}_{error}$ signal are rendered effective in the elevator channel when the aircraft reaches a predetermined position with respect to the glide slope beam, for example, when the beam signal decreases to 22 microamps. At that time, the operation of the beam sensor 11 causes the glide slope engage relay 12 to close, thereby placing the contact arms 12a, b and c in their lowermost positions as shown.

The radio displacement signal from the receiver 10 is then connected through the filter network 13 which filters and modulates the signal to the summation devices 14 and 40. The radio displacement signal via the device 14 is directly effective in the elevator channel while the electromechanical integrator 39 integrates the signal from the summation device 40 before applying it to the elevator channel.

The pitch down reference signal $\dot{h}_{ref}$ provided by the $\dot{h}_{ref}$ potentiometer 20 provides a pitch down signal that is mixed with the radio displacement signal in the summation device 40 and integrated in the integrator 39 before being applied to the elevator channel to cause the aircraft to immediately pitch down. The amplitude of the reference signal $\dot{h}_{ref}$ is arranged such that the aircraft will substantially asymptotically approach and follow the center line of the radio beam based upon a nominal rate of descent.

As the aircraft pitches down, an actual rate of descent signal $\dot{h}$ is provided by the pressure computer 21 which is applied in opposition to the $\dot{h}_{ref}$ signal at the algebraic summation devices 32 and 33. The devices 32 and 33 each provide an error signal representative of the difference between the $\dot{h}_{ref}$ and $\dot{h}$ signals, i.e., $\dot{h}_{error}$. The $\dot{h}_{error}$ signal from the summation device 32 is connected directly to the aircraft control means through the summation device 37, limiter 38, summation device 40, integrator 39, summation devices 14 and 15, and the servo system 16. The $\dot{h}_{error}$ signal deflects the elevator 17 to provide a corrective rate of descent.

Simultaneously, the $\dot{h}_{error}$ signal from the algebraic summation device 33 is applied to the glide slope memory circuit consisting of the demulator 34, RC lag circuit 35 and the modulator 36. The glide slope memory circuit has a predetermined time constant such as 25 seconds. When steady state conditions are established after 25 seconds, the integrated $\dot{h}_{error}$ signal from the circuit 35 becomes effective in the algebraic summation device 37 to equal and oppose the $\dot{h}_{error}$ signal from the algebraic summation device 32. When this condition exists, the integrator action of the circuit 35 stops and the pitch attitude of the aircraft is maintained corresponding to the desired rate of descent. This provides an important advantage in that there is a smooth transition from the glide slope capture mode to the approach mode without any mechanical switching which may introduce undesirable transients at a critical phase.

It will be noted, however, that although the long term effects of the $\dot{h}_{error}$ signal are cancelled, the short term dynamic effects of the $\dot{h}_{error}$ signal from the algebraic summation device 32 continue to be effective to provide dynamic control as the aircraft continues down the radio beam through and including the glide slope extension phase thus providing an additional dynamic control signal not available in the prior art automatic approach systems. This is particularly advantageous in systems where the radio displacement signal is severely attenuated as the runway is approached to compensate for increased signal sensitivity near the radio transmitter.

Under steady state conditions, the center of the beam is acquired and the output from the summation device 14 is zero. The aircraft thus continues along the beam center through the action of the glide slope displacement and integral channels. During this period, the pressure computer 21 memorizes the aircraft rate of descent independent of the glide slope beam angle. Under steady state conditions, by virtue of the glide slope memory circuit including circuit 35, the error signal at the summation device 37 will be zero. This sets up the initial conditions for the glide slope extension phase.

When the middle marker is intercepted, the radio glide slope displacement signal from the receiver 10 is attenuated by a factor of, for example, 8 to 1, by conventional means not shown during the extension phase. Deviation of the aircraft from the established rate of descent results in an error signal at the summation device 37 due to the output $\dot{h}$ of the pressure computer tachometer generator 30. This error signal is applied through the servo system 16 to command an airplane pitch attitude change to restore the aircraft to the beam center. Thus the aircraft is controlled to maintatin the beam center by the memorized rate of descent error signal and the attenuated glide slope deviation signal.

While the invention has been described in its preferred embodiments, it is to be understood that the words which have been used are words of description rather than limitation and that changes within the purview of the appended claims may be made without departing from the true scope and spirit of the invention in its broader aspects.

What is claimed is:

1. In apparatus by means of which an aircraft may be controlled to capture and automatically follow a radio-defined glide slope beam,
   (a) means for providing a reference signal in accordand with a reference rate of descent corresponding to the normal rate of descent of said aircraft when following said glide slope beam,
   (b) means for providing a signal representative of the actual rate of descent of said aircraft,
   (c) means responsive to said reference signal and said actual signal for providing first and second difference signals each representative of the difference therebetween,
   (d) craft control means for controlling the actual rate of descent of said aircraft,
   (e) first circuit means responsive to said first difference signal for supplying the same directly to said craft control means, and
   (f) second circuit means responsive to said second difference signal and including means having a predetermined time constant for supplying said second difference signal to said craft control means after said predetermined time constant and in a sense opposite to the sense of said first difference signal whereby said first difference signal provides short term dynamic control while the long term effects are cancelled without introducing undesirable transients in the actual rate of descent of said aircraft.

2. In apparatus by means of which an aircraft may be controlled to capture and automatically follow a radio-defined glide slope beam,
   (a) means for providing a reference signal representative of a rate of descent defined by the angle of said glide slope beam with respect to the earth and the speed of said aircraft,
   (b) means for providing a signal representative of the actual rate of descent of said aircraft,
   (c) first and second algebraic summation means each responsive to said reference signal and said actual signal for providing first and second difference signals, respectively, each representative of the difference between said reference signal and said actual signal,
   (d) signal utilization means for controlling the rate of descent of said aircraft,
   (e) first circuit means responsive to said first difference signal for supplying the same directly to said signal utilization means, and
   (f) second circuit means responsive to said second difference signal and including means having a predetermined time delay for supplying said second difference signal to said signal utilization means after said predetermined time delay and in a sense opposite to the sense of said first difference signal whereby said first difference signal provides short term dynamic control while the long term effects are cancelled without introducing undesirable transients in the actual rate of descent of said aircraft.

3. In apparatus by means of which an aircraft may be controlled to capture and automatically follow a radio-defined glide slope beam,
   (a) means for providing a reference signal representative of a nominal rate of descent defined by the angle of said glide slope beam with respect to the earth and the approach speed of said aircraft,
   (b) means for providing a signal representative of the actual rate of descent of said aircraft,
   (c) first and second difference providing means responsive to said reference signal and said actual signal for providing substantially identical first and second difference signals each representative of the differences between said reference and actual signals,
   (d) craft control means adapted to control the aircraft in pitch,
   (e) first circuit means responsive to said first difference signal for supplying the same directly to said craft control means, and
   (f) second circuit means responsive to said second difference signal and including integrating means having a predetermined time constant for supplying said second difference signal to said craft control means after said predetermined time constant and in a sense opposite to the sense of said first difference signal whereby said first difference signal provides short term dynamic control while the long term effects are cancelled without introducing undesirable transients in the actual rate of descent of said aircraft.

4. In apparatus by means of which an aircraft may be controlled to capture and automatically follow a radio-defined glide slope beam,
   (a) means for providing a reference signal in accordance with a reference rate of descent corresponding to the normal rate of descent of said aircraft when following said glide slope beam,
   (b) altimeter means for providing a signal representative of the actual rate of descent of said aircraft,
   (c) first and second algebraic summation means each responsive to said reference signal and said actual signal for providing first and second difference signals in accordance with the difference therebetween,
   (d) craft control means including aircraft servo means for controlling the elevator of said craft,
   (e) first circuit means responsive to said first difference signal for supplying the same directly to said craft control means, and
   (f) second circuit means responsive to said second difference signal and including an RC integrating circuit having a predetermined time constant for supplying said second difference signal to said craft control means after said predetermined time constant and in a sense opposite to the sense of said first difference signal, and
   (g) radio receiving means responsive to the displacement of said aircraft from the center of said radio beam for providing a radio signal representative thereof and connected to said craft control means.

5. In apparatus by means of which an aircraft may be controlled to capture and automatically follow a radio-defined glide slope beam,
   (a) means for providing a reference signal in accordance with a reference rate of descent corresponding to the normal rate of descent of said aircraft when following said glide slope beam,
   (b) altimeter means for providing a signal representative of the actual rate of descent of said aircraft,
   (c) first and second algebraic summation means each responsive to said reference signal and said actual signal for providing first and second difference signals in accordance with the difference therebetween,
   (d) craft control means including aircraft servo means for controlling the elevator of said craft,
   (e) first circuit means responsive to said first difference signal for supplying the same directly to said craft control means, and
   (f) second circuit means responsive to said second difference signal and including an RC integrating circuit having a predetermined time constant for supplying said second difference signal to said craft control means after said predetermined time constant and in a sense opposite to the sense of said first difference signal, (g) radio receiving means responsive to the displacement of said aircraft from the center of said radio beam for providing a radio signal representative thereof and connected to said craft control means, and (h) gain programming means connected between said radio means and said craft control means for attenuating the gain of said radio signal as a function of the distance of said craft from the runway.

References Cited in the file of this patent

UNITED STATES PATENTS

| | | |
|---|---|---|
| 2,651,015 | Meredith | Sept. 1, 1953 |
| 2,663,520 | Moseley | Dec. 22, 1953 |